United States Patent [19]

Burgess

[11] Patent Number: 4,822,069
[45] Date of Patent: Apr. 18, 1989

[54] COLLAPSIBLE VEHICULAR TRAILER

[76] Inventor: David Burgess, 5994 SE. 11th Ave., Caldwell, Id. 83605

[21] Appl. No.: 171,016

[22] Filed: Mar. 21, 1988

[51] Int. Cl.$^4$ .............................................. B60P 3/07
[52] U.S. Cl. .................................... 280/402; 280/656; 280/491.1; 414/537
[58] Field of Search ................ 280/656, 402, 491 R, 280/491 D; 414/430, 537, 563

[56] References Cited

U.S. PATENT DOCUMENTS

| | | | |
|---|---|---|---|
| 3,311,245 | 3/1967 | Galey | 414/537 |
| 3,570,690 | 3/1971 | Wegener | 414/563 |
| 3,653,680 | 4/1972 | Denny | 280/656 |
| 3,674,167 | 7/1972 | Roberts | 414/484 |
| 3,938,830 | 2/1976 | Lane | 280/491 R |
| 3,947,062 | 3/1976 | Pierce | 280/401 D |
| 4,081,090 | 3/1978 | Hopkins | 280/402 |

Primary Examiner—Charles A. Marmor
Assistant Examiner—Karin Tyson
Attorney, Agent, or Firm—Frank J. Dykas

[57] ABSTRACT

A collapsible vehicular trailer 10 using a standard towing dolly 1 as its wheel base. The collapsible vehicular trailer 10 is connected to a tow vehicle by a collapsible V-shaped trailer tongue 11. The collapsible trailer tongue 11 is connected to the tow vehicle by a hitch-ball coupler 15 and at its other end to a pair of base platforms 18 which detachably straddle the axles of towing dolly 1. Base platforms 18 each have a ramp retaining lip 20 located at their trailing edges for detachably engaging ramps 45. A pivot support platform 23 also straddles the two axles of towing dolly 1 and is centered between base platforms 18. Pivot support platform 23 provides a pivotal connecting point for the pivot frame 30 which has opposing wheel cradles 36 and 37 attached to the ends of main pivot frame members 31. The opposing wheel cradles 36 and 37 have a stop plate 41 and wheel retaining chain 39 for securely attaching a pair of wheels on the vehicle to be towed.

1 Claim, 4 Drawing Sheets

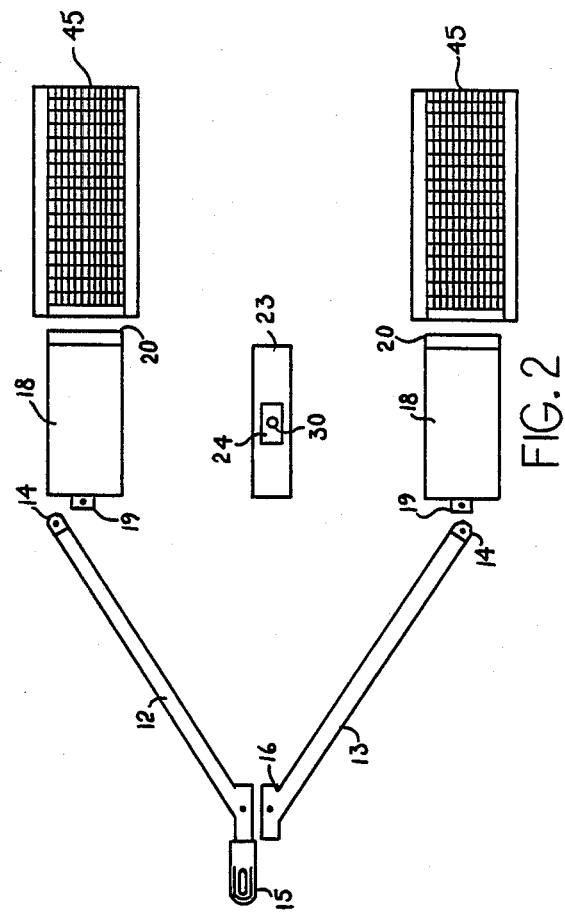

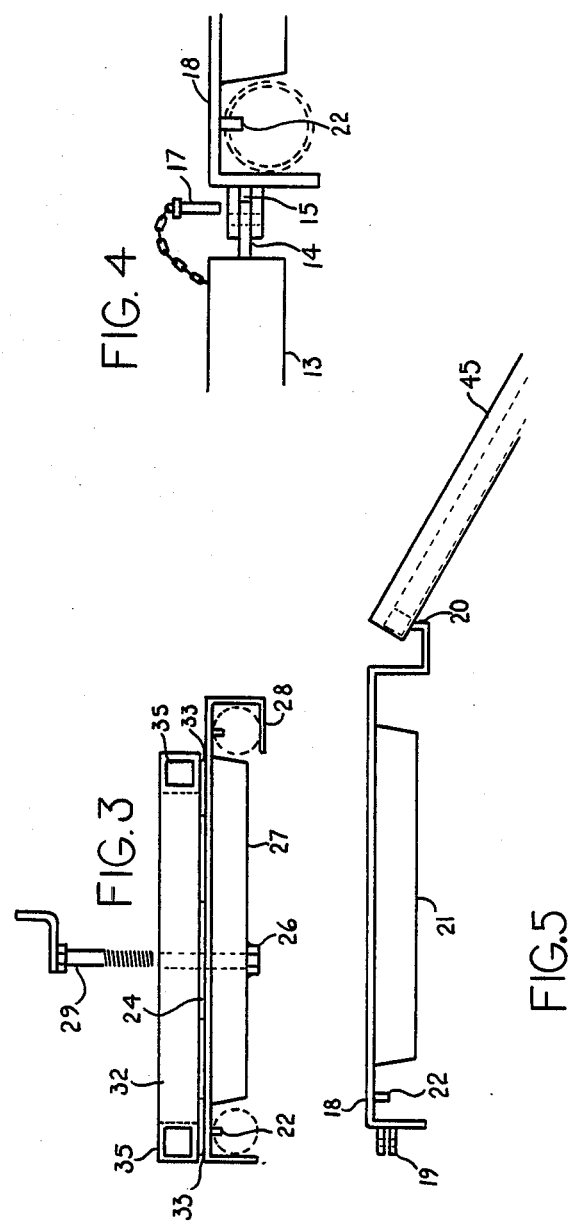

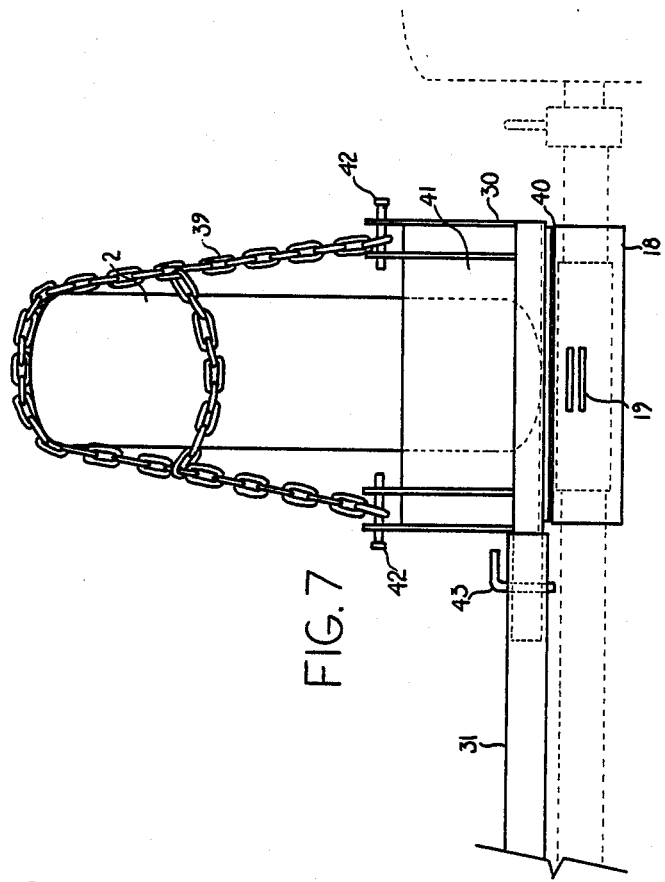
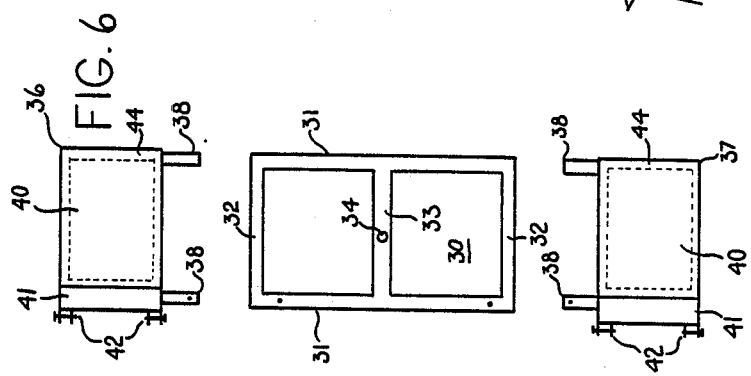

COLLAPSIBLE VEHICULAR TRAILER

BACKGROUND OF THE INVENTION

1. Technical Field.

This invention relates to trailers for towing vehicles. In particular it relates to a collapsible trailer for towing a vehicle which utilizes a standard towing dolly as its wheel base.

2. Background Art.

The most common method of towing an unmanned automobile is to use a tow truck which lifts one end of the car, disengaging from the ground one of the two sets of wheels of the automobile, and therefor allows the tow truck to turn a corner without skidding the towed vehicle around the corner. This method works providing that one has access to a tow truck and that the vehicle to be towed is able to be lifted and held during towing.

Front wheel drive vehicles, however, pose a unique problem to the tow truck operator in that a large percentage are unable to be lfited at their front end by the standard tow truck lifting apparatus without causing damage to the vehicle. This is because many of the front wheel drive vehicles have power train assemblies which are incompatible with standard tow truck lifting and towing rigging. Additionally, many front wheel drive vehicles cannot be towed backwards because of either of two reasons, the first being that the drive train may be damaged as a result of being towed backwards, and secondly in the event that the reason the vehicle is being towed is because it has been impacted from the front thereby making the front wheel assembly not operable. A special and very expensive hydraulic apparatus has beem employed to lift front wheel drive vehicles by their front wheels so as not to cause damage to the drive train. Because the hydraulic apparatus is so expensive, many tow truck operators cannot afford it and consequently cannot efficiently tow front wheel drive vehicles.

As a result current practice is that the tow truck owner must resort to the use of a vehicular trailer of some sort. Unfortunately, a towing trailer cannot be towed behind the two trucks since, in the event, that the towing trailer is not used, it will interfere with towing operation. Likewise, the tow truck operator cannot carry a standard vehicle trailer on the tow truck because, quite simply, it is too heavy and bulky for one, or even two people to hoist or place into a storage position. Another alternative currently available is the purchase of a specialized tow truck which functions in a completely different manner from the standard tow truck in that it is a sophisticated, hydraulically raised, ramp type truck bed and winch assembly wherein the back end of the ramp is lowered to receive the disabled vehicle, which is then hoisted up onto the ramp. After being towed onto the ramp, the hydraulicaly operated ramp is returned to a horizontal position and the disabled vehicle is, for all practical purposes, loaded onto a truck bed for transport. This type of a tow truck is very expensive and cannot be easily used in all of the varied applications that may be required.

What is needed is a collapsible vehicular trailer that can be conveniently stored upon a standard tow truck, and preferably, which incorporates and utilizes the standard towing dollies normally and routinely carried by standard tow truck operators.

Another application for this particular invention is found in the use of standard service trucks as opposed to tow trucks. Many repair shops, particularly those along major highways, operate repair trucks in conjunction with tow trucks. These repair trucks carry various automotive parts and supplies such as spark plugs, fan belts, gasoline, and the like. If the operator of a disabled vehicle were to call a service station operating a service truck, and when the service truck operator responds to the scene of the disabled vehicle, the serviceman discovers, that a repair cannot be made at that location, then, using currently available equipment, the service truck operator would have to call for a tow truck. If, however, a collapsible vehicular trailer such as that disclosed in the present invention were to be carried upon the service truck, then it would be a simple matter to assemble the vehicle trailer to facilitate towing the disabled vehicle to the automotive service center.

There are other cases wherein a person might want to tow a vehicle who does not have access to a tow truck, such as towing a second vehicle behind a motor home, where the second vehicle is a front wheel drive automobile. The lift mechanism provided by a recreational vehicle towing mechanisms in common use today are not suitable for front wheel drive vehicles.

Denny, U.S. Pat. No. 3,653,680, teaches a tow trailer with a folding carrier platform. When the trailer is not in use, the platform folds up so as to decrease the overall length of the trailer. Denny also teaches rear mounted wheels which swivel independently, very similar to casters. The biggest problem with the Denny device is that is can not be broken down easily for storage when not in use and must be pulled intact to transport it to the towed vehicle.

Roberts, U.S. Pat. No. 3,674,167, discloses a vehicle ambulance adapted to receive and transport disabled vehicles. Roberts teaches a basic platform trailer having four wheels which are spaced closely together to enable turning. A disabled vehicle is winched up onto the trailer platform by an electric winch and is then secured for transporting. The disadvantages to the Roberts device are that it must be transported intact to the site and is not collapsible to provide for convenient storage and transportation.

Accordingly, it is an object of this invention to provide a collapsible vehicular trailer which can be conveniently stored and transported and uses a standard, collapsible towing dolly as its wheel base. Another object of the present invention is to provide a simple apparatus which can be attached to a standard trailer hitch ball for towing front wheel drive vehicles.

DISCLOSURE OF INVENTION

These objects are accomplished by pivotally supporting one set of wheels of the vehicle to be towed on the frame of the standard towing dolly which is rigidly attached to the towing vehicle by a collapsible tongue. The present invention provides a collapsible V-shaped tongue assembly which has a hitch ball coupler. The ends of the collapsible tongue members have means for engaging a pair of base platforms which are transversely positioned across the two axles of the towing dolly. The base platforms have a ramp retaining lip along their back edges for detachably engaging the ramps which facilitate receiving the vehicle to be towed.

A pivot support platform is centered between the two base platforms and is transversely disposed across the two axles of the towing dolly. The pivot support platform provides a receiving hole and thrust bearing for pivotally engaging the pivoting vehicle carrier platform. The pivoting vehicle carrier platform consists of a pivot frame detachably connected to two opposing wheel cradles, for securely harboring a pair of wheels of the vehicle to be towed.

When the collapsible trailer is broken down onto its various components it can be easily stored along with the towing dolly. This provides an economical solution to the problem of towing front wheel drive vehicles for tow truck operators. The collapsible trailer also provides a convenient and economical towing device for recreational vehicle enthusiasts wishing to tow a second vehicle behind a motor home.

BRIEF DESCRIPTION OF THE DRAWINGS

FIG. 2 is a top plan view of the tongue, base platforms, ramps, and pivot support platform.

FIG. 3 is a side view of the pivot frame and the pivot support platform.

FIG. 4 is a side view of the connection between the tongue and base platform.

FIG. 5 is a side view of a base platform and ramp.

FIG. 6 is a top plan view of the pivot frame and opposing wheel cradles.

FIG. 7 is a front view of the right wheel cradle and base platform.

BEST MODE FOR CARRYING OUT INVENTION

Figure 1:
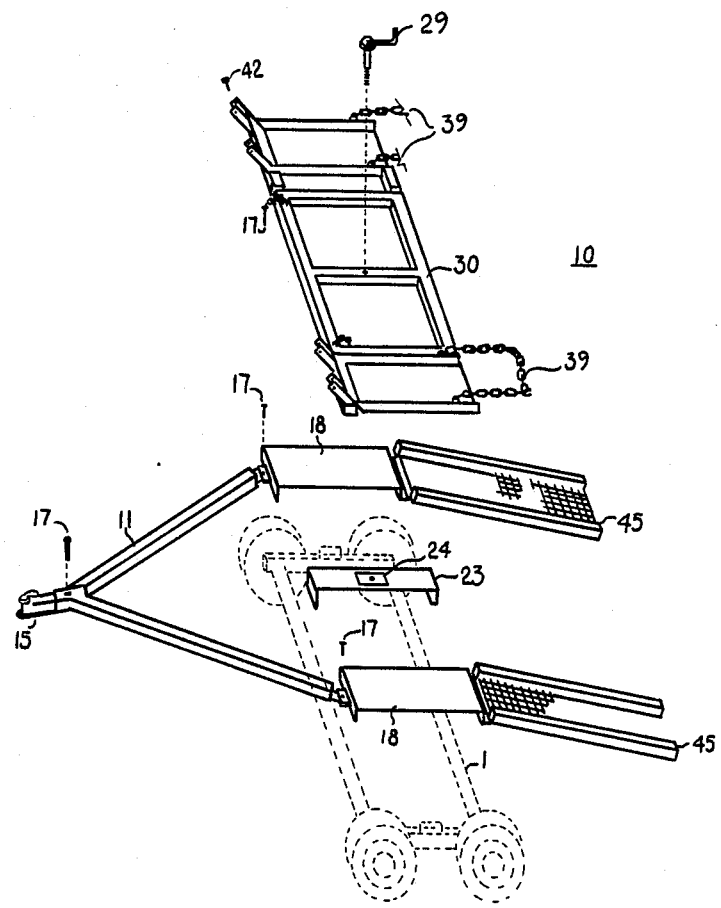
FIG. 1 is an exploded top perspective view of the collapsible vehicular trailer and a typical towing dolly.

The collapsible vehicular trailer generally designated a 10 which uses a standard towing dolly 1, is shown to advantage of FIG. 1.

Referring specifically to FIGS. 1, 2, 4 and 5, the invention provides a V-shaped assembly of the tongue members 12 and 13, which form the collapsible trailer tongue 11. A hitch ball coupler 15 is connected to the end of tongue member 12. Tongue member 13 has an over-lapping channel connector 16 welded to one end which detachably engages tongue member 12 to form the V-shaped collapsible trailer tongue 11. Tongue members 12 and 13 have end plates 14 for engaging tongue connectors 19 on base platforms 18. Collapsible trailer tongue 11 is connected to each base platform 18 using pins 17, end plates 14, and tongue connectors 19.

Base platforms 18 are generally rectangular in shape and have their leading edge bent downward at a 90° angle. Tongue connectors 19 are located on the front face of the leading edge of the base platforms 18. A retaining pin 22 protrudes perpendicularly from the bottom surface of the base platforms 18 and is used to engage corresponding holes (not shown) in front axle on the towing dolly 1. A support member 21 is welded along the longitudinal axis of the base platforms 18 and provides necessary structural integrity. The trailing edge of each base platform 18 forms ramp retaining lip 20 and frictionally engages the rear axle of towing dolly 1.

A pivot support platform 23 straddles the two axles of the towing dolly 1 and is generally rectangular in shape. Its leading edge is bent downward at a 90° angle, while its trailing edge forms a dolly axle retaining lip 28. A second support member 27 is welded to the underside of pivot support platform 23 along its longitudinal axis. Pivot bolt hole 25 is located on the longitudinal axis approximately equidistant between the two axles of towing dolly 1 and has a pivot bolt nut 26 welded around the circumference of the bottom of the pivot bolt hole 25. Thrust bearing 24 is attached around the circumference of the top of pivot bolt hole 25 and is made from a self-lubricating plastic. Retaining pin 22 is provided on the underside of the pivot support platform 23 for engaging the front axle of towing dolly 1 in a manner similar to that for base platforms 18. The combination of the retaining pin 22 and dolly axle retaining lip 28 provide a secure and detachable means for attaching pivot support platform 23 to the axles. It is necessary to securely attach the pivot support platform 23 because it provides the sole support for the vehicle in tow.

A pair of detachable ramps 45 generally defined by rectangular planes and having a perpendicular segment at one end for engaging the retaining lip 20 of each of the base platforms 18 are provided.

Pivot bolt 29 as shown in FIG. 3 which has an L-shaped crank handle welded to its top and extending perpendicularly outward and upward is used for detachably and pivotally engaging a pivoting vehicle carrier platform to the pivot support platform 23.

Referring now to FIG. 6, the pivoting vehicle carrier platform which consists of pivot frame 30 and opposing wheel cradles 36 and 37 is shown. Pivot frame 30 is constructed using two main pivot frame members 31 held in parallel spaced relationship by a pair of pivot frame cross members 32. A center pivot frame member 33 is centered between and parallel to the side pivot frame members 32 and connected at its ends to main pivot frame members 31. Pivot bolt hole 34 is transversely disposed at a point equidistant from the ends of the center pivot frame member 33 along its longitudinal axis. Openings 35, in the ends of the main pivot frame members 31 are provided for engaging the engagement stubs 38 of the opposing wheel cradles 36 and 37 and are best shown in FIGS. 3, 6 and 7. Cradle connecting pins 43 are provided for connecting the wheel cradles 36 and 37 to the pivot frame 30.

Referring again to FIGS. 6 and 7, opposing wheel cradles 36 and 37 are generally mirror images of one another wherein 36 designates the right wheel cradle and 37 denotes the left wheel cradle. Wheel cradles 36 and 37 are generally rectangular in shape and have a flat bottom plate 44 having parallel side edges bent upwardly at 90° angles. The front edge has a stop plate 41 connected to it which extends angularly forward and upward and has a pair of wheel restraining chain connectors 42 located at its upper edge. Each of the opposing wheel cradles 36 and 37 has two engagement stubs 38 protruding perpendicularly outward from the inside edge, and are disposed in a parallel spaced relationship. The engagement stubs 38 are sized, shaped and spaced so as to allow engagement of the openings 35 in the ends of pivot frame 30. Each of the two wheel cradles 36 and 37 further has one end of a wheel restraining chain 39 connected to each of the two sides of each of the two wheel cradles 36 and 37 as shown in FIG. 1. The chains are utilized by draping them over the wheel 2 of the vehicle to be towed and detachably connecting them as shown in FIG. 7 to the wheel restraining chain connectors 42.

As can be understood from the above detailed description, the present invention breaks down into a number of parts which can be easily and conveniently stored upon a two truck, or in a service truck not ordinarily equipped for towing. To assemble the collapsible vehicular trailer, the operator first assembles the standard towing dolly assembly which normally is comprised of two axles and wheel sets assembled in tandem. Such dolly assemblies are well known in the art and are not described herein, although a standard dolly assembly can be seen in FIG. 1 of the drawings. After the standard dolly assembly 1 has been assembled, the operator sets in place base platforms 18 using detent pin 17 engaging holes in the front axle of dolly assembly 1. End plates 14 of tongue members 12 and 13 are then inserted into tongue connectors 19 and pinned in place with pins 17. The opposite ends of tongue members 12 and 13 are then connected together, again also by means of pins between socket coupler 15 and overlapping channel connector 16 to form a tongue for the trailer which is rigidly attached to the front axle of towing dolly 1.

Pivot support platform 23 is then positioned on towing dolly 1, after which the operator is ready to assemble the pivoting vehicle carrier platform.

A pivoting vehicle carrier platform is assembled by inserting engagement stubs of wheel cradles 36 and 37 into pivot frame members 31 and pinning the same in place by means of pins 43 as is shown in FIG. 6 and 7. The pivoting vehicle carrier platform is then set atop the pivot support platform 23 with pivot bolt hole 25 aligned with the corresponding bolt hole 34 in center pivot frame member 33 and pivot bolt 29 is inserted and screwed into the retaining threads of pivot bolt nut 26.

In this manner the collapsible vehicle trailer is easily assemblied from small parts, that are stoutly constructed of high strength steel, yet small enough to be easily portable and manageable for one person who can assemble the trailer without assistance.

While there is shown and described the present preferred embodiment of the invention, it is to be distinctly understood that this invention is not limited thereto but may be variously embodied to practice within the scope of the following claims.

I claim:

1. A collapsible vehicular trailer, for use with a standard towing dolly having two axles, comprising:
   a pair of base platforms, each having a retaining pin for detachably engaging a towing dolly when the base platforms are positioned transversely across the axles of the towing dolly, each base platform further having means for rigidly and detachably connecting to a trailer tongue and a ramp retaining lip for detachably connecting a ramp to each base platform;
   a V-shaped collapsible tongue having a hitch-ball coupler removably attached to the base platforms;
   a pair of ramps generally defined by rectangular planes having a perpendicular segment at one end for detachably engaging the retaining lips of the base platforms;
   a pivot support platform having a retaining pin receiving means for detachably engaging the towing dolly, also having a dolly retaining lip for detachable engaging the towing dolly;
   a pivot frame generally rectangular in shape for receiving and supporting the tires of a towed vehicle for pivotal attachment to the pivot support platform;
   a pivot bolt for pivotally connecting the pivot frame to the pivot support platform.

* * * * *